United States Patent
Blum et al.

(10) Patent No.: US 7,001,643 B1
(45) Date of Patent: Feb. 21, 2006

(54) DECORATIVELY ENAMELED PLASTIC MOLDED PARTS FOR MOTOR VEHICLES

(75) Inventors: Joachim Blum, Remscheid (DE); Manfred Mass, Remscheid (DE); Helga Stegen, Wuppertal (DE)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/069,096

(22) PCT Filed: May 9, 2000

(86) PCT No.: PCT/EP00/04121

§ 371 (c)(1),
(2), (4) Date: Nov. 13, 2001

(87) PCT Pub. No.: WO00/67920

PCT Pub. Date: Nov. 16, 2000

(30) Foreign Application Priority Data

May 10, 1999   (DE) ................................ 199 21 646

(51) Int. Cl.
*B05D 1/02* (2006.01)
*B05D 1/36* (2006.01)
*B05D 3/10* (2006.01)
*B05D 7/02* (2006.01)
*B05D 7/26* (2006.01)

(52) U.S. Cl. ................... 427/412.1; 427/299; 427/322; 427/407.1; 427/421.1; 427/427.7

(58) Field of Classification Search ................ 428/195, 428/195.1, 212, 411.1, 480, 482, 483, 500; 427/299, 322, 458, 470, 471, 532, 533, 535, 427/536, 565, 551, 558, 407.1, 412.1, 412.3, 427/412.5

See application file for complete search history.

(56) References Cited

U.S. PATENT DOCUMENTS

| | | | | |
|---|---|---|---|---|
| 3,113,883 A | * | 12/1963 | James | 492/28 |
| 3,700,540 A | * | 10/1972 | Buteux | 428/220 |
| 4,877,657 A | * | 10/1989 | Yaver | 428/31 |
| 5,532,045 A | * | 7/1996 | Wade | 428/187 |
| RE35,739 E | * | 2/1998 | Ellison et al. | 428/31 |
| 6,001,469 A | * | 12/1999 | Verardi et al. | 428/333 |

FOREIGN PATENT DOCUMENTS

| | | | |
|---|---|---|---|
| EP | 0 329 336 A2 | * | 2/1989 |
| GB | 2 224 283 A | * | 11/1991 |
| WO | WO9528688 A | | 9/1995 |

* cited by examiner

*Primary Examiner*—Timothy Meeks
*Assistant Examiner*—William Phillip Fletcher, III
(74) *Attorney, Agent, or Firm*—Steven C. Benjamin

(57) ABSTRACT

Plastics moulded parts, suitable for the motor vehicle sector, consisting of a transparent plastics material the rear face of which is provided with a colour- and/or effect-producing lacquer.

9 Claims, No Drawings

DECORATIVELY ENAMELED PLASTIC MOLDED PARTS FOR MOTOR VEHICLES

BACKGROUND OF THE INVENTION

The invention provides decorative plastics moulded parts, in particular for the motor vehicle sector, a process for their production and their use.

Plastics parts are being used to an increasing extent in the construction of cars, not least for weight reasons. Often, the visible surface of plastics parts is provided with a colour and/or effect-producing lacquer in order to give a decorative effect.

A fundamental problem is the sensitivity to mechanical effects of the coloured and/or effect-lacquered plastics parts used in the car construction industry. Plastics lacquers are extraordinarily sensitive to scratching and the impact resistance of colour- and/or effect-lacquered plastics parts is low, in particular at low temperatures. These weaknesses appear in particular in the case of coloured and/or effect-lacquered plastics bumpers, anti-bump strips or panels. Plastics parts suffer considerable damage even on slight contact, for example inadvertent impacts when parking the vehicle, for example due to visibly obvious scratches in the external lacquer or even due to actual fracture of the plastics part.

The object of the invention is the provision of decorative lacquered plastics parts with improved suitability for use in the motor vehicle sector, in particular in the car construction industry for the exterior of vehicles.

The object can be achieved by transparent plastics parts which are lacquered on the rear face to provide a colour and/or effect so that the impression of colour can be perceived from the front face.

DETAILED DESCRIPTION OF THE INVENTION

Thus, the invention provides plastics moulded parts which are suitable in particular for use in the motor vehicle sector and are characterised in that they consist of a transparent plastics material and the face turned away from the observer (the rear face) is provided with a colour- and/or effect-producing lacquer.

The face of the plastics moulded part turned away from the observer is the opposite face from the visible surface after mounting, for example on a motor vehicle, and is also called the non-visible face or rear face for short in the following.

The decorative lacquered plastics parts may be any plastics moulded parts at all such as are used, for example in the motor vehicle sector as mass-produced items or as special features, for example, bumpers, anti-bump strips, side panels, sills, mirror housings, door handles, engine bonnets, boot lids, tailgates, wings, spoilers, hub caps.

It is an essential feature of the invention that the plastics parts consist of a transparent, preferably completely transparent, plastics material. Suitable transparent plastics materials include both elastomers which are known per se and also thermoplastic and thermoset materials which are known per se, preferably amorphous plastics materials. Examples are polycondensates, polyaddition products and polymers such as polycarbonates, polyesters such as e.g. polybutyleneterephthalate, polyamides, silicone plastics, polyethers such as e.g. polyoxymethylene, polypropylene oxide or polybutylene oxide, polyurethanes, polyureas, polyolefins, poly(meth)acrylate plastics such as polymethylmethacrylate, polystyrene, acrylonitrile/styrene and acrylonitrile/styrene/acrylate plastics and any transparent blends. Polycarbonates, polyesters, polymethylmethacrylate, polyamides, acrylonitrile/styrene/acrylate plastics are preferred.

The transparent plastics parts may contain transparent pigments or auxiliary substances such as e.g. silicon dioxide, microtitanium dioxide, glass fibres. In this case the refractive indices of the plastics material and of the transparent pigment or auxiliary substance are preferably close to each other or correspond to each other.

To produce special effects, the plastics compositions for the transparent plastics parts, which are colourless in themselves, may be transparently coloured, for example, using dyes and/or may contain absorption pigments and/or effect pigments in small non-opacifying amounts.

Both the front visible face and the rear face of the transparent plastics part may have a completely smooth, high-gloss surface, or the surfaces may possess raised sections or indentations, for example in the form of an imprinted pattern or logo, in order to produce special effects. The surface of the rear face is preferably smooth. The front visible face has no colour- and/or effect-producing topcoat lacquer. It may be uncoated or coated transparently, for example provided with a transparent lacquer, in particular with a colourless clear lacquer layer. Instead of a lacquer, however, a transparent plastics film may also be used as a transparent coating, this being glued onto the front face of the transparent plastics part. Colourless transparent plastics films or transparently coloured plastics films are suitable as transparent plastics films. The transparent plastics films may also contain effect pigments. Furthermore, the transparent plastics films may also be lacquered and/or printed in a non-opacifying manner (e.g. in the form of a pattern or image). Either clear lacquer layers or monolayered or multilayered transparently coloured lacquers and/or effect lacquers are suitable as non-opacifying film lacquers.

It is an essential feature of the invention that the rear face of the transparent plastics parts is provided with a colour- and/or effect-producing monolayered or multilayered opaque lacquer. For this purpose, a colour- and/or effect-producing coating layer is applied directly to the untreated or pretreated rear face of the plastics part.

Pretreatment of the rear face of the transparent plastics part is expedient in particular when, from experience, it is a plastics material to which lacquer coatings adhere only weakly. Pretreatment may consist, for example, of physically and/or chemically treating the rear face of the transparent plastics part to be colour and/or effect lacquered and/or providing this face with a transparent adhesion-promoting coating. These are methods which are well-known from the area of plastics parts lacquering for producing adequate adhesion. Examples of physical and chemical methods which may be used for treating the rear face of transparent plastics parts are corona treatment, plasma treatment, flame treatment, irradiating with ultraviolet light, optionally in the presence of photoinitiators which decompose to form radicals, etching with aggressive chemical agents, for example with fluorine or sulfur trioxide. One method only or a combination of methods of treatment may be used. These may take place simultaneously or in sequence. Flame treatment or plasma treatment are the preferred methods of treatment. However, a transparent adhesion-promoting coating is particularly preferably applied to the optionally physically and/or chemically treated rear face before the colour-and/or effect-producing coating is applied. The rear face is preferably not physically and/or chemically treated and only a transparent adhesion-promoting coating is applied before applying the colour-and/or effect-producing coating. Application of the transparent adhesion-promoting coating may preferably be achieved by spraying.

The transparent adhesion-promoting coating may be applied using a conventional adhesion-promoting coating agent. Adhesion-promoting coating agents are liquid water-based coating agents or coating agents based on organic solvents. For example, in the region of plastics lacquering, these are conventional adhesion promoters, for example epoxide/amine or polyurethane systems. The transparent adhesion-promoting coating agents preferably contain one or more adhesion-promoting active constituents. The adhesion-promoting components may be present as such on their own or as additives in combination with binders or binder systems. The amount of adhesion-promoting components in adhesion-promoting coating agents is, for example, between 2 and 25, preferably between 3 and 20 wt. %. The adhesion-promoting coating agents are, in particular, those which are known from or are recommended for the area of lacquering plastics parts made of polyolefin plastics such as, for example, polyethylene or polypropylene. They are preferably applied by spraying, generally in a dry layer thickness of for example between 1 and 30 μm, depending on the type of adhesion-promoting coating agent. Before further over-painting with the colour- and/or effect-producing coating agent, the transparent adhesion-promoting coatings produced from the adhesion-promoting coating agents are generally dried, or in the case of the presence of a chemically curable binder system, cured, for example at temperatures between 20 and 130° C.

Examples of preferred adhesion-promoting components are polyolefins which are chlorinated and/or provided with carboxyl groups, for example by maleinisation (reaction with maleic anhydride) and optionally chemically further modified. Chlorine-containing polyolefins are preferred. They have, for example, number average molecular weights of 5000 to 50000. The chlorine content is, for example, 10 to 40 wt. %.

Therefore the invention also provides, in one embodiment, a process for preparing plastics moulded parts according to the invention which is characterised in that the face turned away from the observer of a transparent plastics moulded part is subjected to a physical and/or chemical treatment to promote adhesion and/or is provided with a transparent adhesion-promoting coating and is then provided with a colour- and/or effect-producing lacquer.

In another embodiment, the invention also provides a process for preparing plastics moulded parts according to the invention which is characterised in that the face turned away from the observer of a transparent plastics moulded part is provided directly with a colour- and/or effect-producing lacquer.

According to the invention, a colour- and/or effect-producing coating is applied in a dry layer thickness of for example 10 to 30 μm to the rear face of the transparent plastics part, optionally physically and/or chemically treated and/or provided with a transparent adhesion-promoting coating as explained above, this can for example, preferably be achieved by spraying. Conventional topcoat lacquers or preferably conventional base lacquers such as are used to prepare colour- and/or effect-producing base lacquer layers within base lacquer/clear lacquer two-layered lacquers may be used as colour- and/or effect-producing coating agents and are known in large numbers, for example from the patent literature.

The base lacquers may be physically drying or be cross-linkable with the formation of covalent bonds. Base lacquers which cross-link with the formation of covalent bonds may be conventional internally or externally cross-linking systems. The base lacquers are liquid coating agents. They may be single-component or multi-component coating agents, single-component agents being preferred. The base lacquers are based on organic solvents or, preferably, are water-based base lacquers.

The base lacquers are conventional lacquer systems which contain one or more conventional binders as film-producing binders. They may, if the binders are not internally cross-linking or self-drying, optionally also contain a cross-linking agent. Neither the binder component nor the cross-linking component is subject to any kind of restriction. Polyester, polyurethane and/or (meth)acrylic copolymer resins, for example, may be used, as film-producing binders. The choice of the optionally present cross-linking agent is not critical, it is governed by the functionality of the binder.

In addition to conventional physically drying and/or chemically cross-linking binders, the base lacquer contains inorganic and/or organic coloured pigments and/or effect pigments such as e.g. titanium dioxide, iron oxide pigments, carbon black, azo pigments, phthalocyanine pigments, quinacridone pigments, metal pigments, e.g. titanium, aluminium or copper, interference pigments such as e.g. titanium dioxide coated aluminium, coated mica, graphite effect pigments, platelet-shaped iron oxide, platelet-shaped copper phthalocyanine pigments. Furthermore, the base lacquers may contain conventional lacquer additives such as e.g. fillers, catalysts, flow control agents, bonding agents, anti-crater agents or light stabilisers, optionally in combination with antioxidants.

In particular when the plastics parts according to the invention are intended to be the same colour as the colour of bodywork, it is expedient to use the same base lacquer for lacquering the rear face of the transparent plastics parts as for lacquering the bodywork of the motor vehicle.

The colour- and/or effect-producing coating applied according to the invention to the rear face of transparent plastics parts may be a final coating. As sealant, however, one or more further coatings may also be applied to the colour- and/or effect-producing coating and/or one or more protective films may be glued to the coating. Both steps may be used to protect the colour- and/or effect-producing coating located thereunder, for example to protect from physical and/or chemical effects. The further coating or protective film may be a transparent or opaque, light-proof coating or a transparent or opaque light-proof film respectively. The use of an opaque, light-proof coating or film is expedient in particular when the colour- and/or effect-producing coating is applied in a non-opaque layer thickness.

The invention also provides the use of decorative lacquered plastics parts according to the invention in the motor vehicle sector, in particular for applications on the exterior of the vehicle, for example, as bumpers, anti-bump strips, side panels, sills, mirror housings, door handles, engine bonnets, boot lids, tailgates, wings, spoilers, hub caps.

Plastics parts according to the invention are mounted on the outside of a motor vehicle, for example clipped on, screwed on or glued on. They are mounted in such a way that the coloured and/or effect lacquered rear face of the plastics parts according to the invention is fixed as the face turned away from the observer. Plastics parts according to the invention may have exactly the same colour as the colour of the body or may differ from the colour of the body, for example the plastics part may have a colour which contrasts with that of the actual colour of the bodywork.

Plastics parts according to the invention are motor vehicle parts which are regarded as decorative in the eye of the observer. In the case of effect-lacquered plastics parts according to the invention, the impression of the effect is very noticeable. Plastics parts according to the invention are less sensitive to scratching and more mechanically stable than corresponding plastics parts according to the prior art which are coloured and/or effect-lacquered on the visible surface.

Example 1 (comparison)

A black water-based base lacquer is sprayed in an opaque dry layer thickness of 18 $\mu$m onto a specimen sheet of grey-coloured polycarbonate. After allowing evaporation for 5 minutes at 80° C., this is overpainted in a dry layer thickness of 40 $\mu$m with a commercially available two-component PU clear lacquer by compressed air spraying and dried for 30 minutes at 85° C. (oven temperature). The lacquer is scratched and some is scraped off by scraping with the blade of a knife. The damage is visually very obvious no matter what the angle of observation and also from a distance of greater than 1 to 2 meters, the grey substrate is visible at the site of damage.

Example 2 (comparison)

A black water-based base lacquer is sprayed in an opaque dry layer thickness of 18 $\mu$m onto a specimen sheet of clear transparent polycarbonate. After allowing evaporation for 5 minutes at 80° C., this is overpainted in a dry layer thickness of 40 $\mu$m with a commercially available two-component PU clear lacquer by compressed air spraying and dried for 30 minutes at 85° C. (oven temperature). The lacquer is scratched and some is scraped off by scraping with the blade of a knife. The damage is visually very obvious no matter what the angle of observation and also from a distance of greater than 1 to 2 meters.

Example 3 (according to the invention)

A black water-based base lacquer is sprayed in an opaque dry layer thickness of 18 $\mu$m onto a specimen sheet of clear transparent polycarbonate. After allowing evaporation for 5 minutes at 80° C., this is overpainted in a dry layer thickness of 40 $\mu$m with a commercially available two-component PU clear lacquer by compressed air spraying and dried for 30 minutes at 85° C. (oven temperature). The unlacquered face of the specimen sheet is scratched at one place by scraping with the blade of a knife. The damage is visually obvious only at almost a ninety degree angle of observation. When observed from a distance of greater than 1 to 2 meters, the damaged place is visually inconspicuous. The impression of colour is retained because the colour-producing lacquer on the rear face is undamaged.

Example 4 (according to the invention)

A black water-based base lacquer is sprayed in an opaque dry layer thickness of 18 $\mu$m onto a specimen sheet of clear transparent polycarbonate. After allowing evaporation for 5 minutes at 80° C., this is overpainted in a dry layer thickness of 40 $\mu$m with a commercially available two-component PU clear lacquer by compressed air spraying. In addition, the uncoated face on the other side of the specimen sheet is overpainted in a dry layer thickness of 40 $\mu$m with the two-component PU clear lacquer. Then the sheet is dried for 30 minutes at 85° C. (oven temperature). The clear lacquer layer applied directly to the plastics surface is scratched and some is scraped off by scraping with the blade of a knife. The damage is visually obvious only at almost a ninety degree angle of observation. When observed from a distance of greater than 1 to 2 meters, the damaged place is visually inconspicuous. The impression of colour is retained because the colour-producing lacquer on the rear face is undamaged.

What is claimed is:

1. A process for applying a color effect-producing layer on a substantially transparent plastic molded part having a front face and a rear face, wherein the rear face is turned away from an observer, comprising the steps of:
    (a) optionally pretreating the rear face of the substantially transparent plastic molded part with a pretreatment selected from the group consisting of a physical/chemical treatment, an adhesion-promoting coating and combinations thereof; and
    (b) spray-applying at least one opaque lacquer layer disposed directly upon the rear face of the substantially transparent plastic molded part to produce a lacquer layer having a thickness of 10 to 30 $\mu$m;
    wherein the opaque lacquer is selected from the group consisting of colored lacquer, effect-producing lacquer and combinations thereof, and further wherein the plastic molded part is selected from the group consisting of bumpers, side panels, sills, mirror housing, door handles, engine bonnets, boot lids, tailgates, wings, spoilers and hub caps.

2. The process according to claim 1, wherein the rear face of the substantially transparent plastic molded part is pretreated with a physical/chemical treatment selected from the group consisting of corona treatment, plasma treatment, flame treatment, irradiating with ultraviolet light, and combinations thereof.

3. The process according to claim 2, wherein the substantially transparent plastic molded part is completely transparent.

4. The process according to claim 2, wherein the substantially transparent plastic molded part contains at least one of dyes, absorption pigments in non-opacifying amounts, effect pigments in non-opacifying amounts or combinations thereof.

5. The process according to claim 2, wherein the transparent plastic molded part further comprising an auxiliary substance, wherein said substance is selected from the group consisting of silicon dioxide, microtitanium dioxide, and glass fibers and combinations thereof.

6. The process according to claim 2, wherein the substantially transparent plastic molded part is selected from the group consisting of elastomers, thermoset materials, and thermoplastic materials.

7. The process according to claim 6, wherein the substantially transparent plastic molded part is selected from the group consisting of polycondensates, polyesters, polyethers, poly(meth)acrylate plastics, acrylonitrtile/styrene/acrylate plastics, and any transparent blends thereof.

8. The process according to claim 1, wherein the rear face of the substantially transparent plastic molded part is pretreated with an adhesion promoting coating.

9. A process for producing a transparent plastic molded part by applying a color effect-producing layer on a substantially transparent plastic molded part having a front face and a rear face,
    wherein the rear face is turned away from an observer, comprising the steps of:

(a) optionally pretreating the rear face of the substantially transparent plastic part with a pretreatment selected from the group consisting of a Physical/chemical treatment, an adhesion-promoting coating and combinations thereof; and
(b) spray-applying at least one opaque lacquer layer disposed directly upon the rear face of the substantially transparent plastic molded part to produce a lacquer layer having a thickness of 10 to 30 μm:

wherein the opaque lacquer is selected from the group consisting of colored lacquer, effect-producing lacquer and combinations thereof, and further wherein the transparent plastic molded part is selected from the group consisting of bumpers, side panels, sills, mirror housing, door handles, engine bonnets, boot lids, tailgates, wings, spoilers and hub caps and comprises a further step of applying an additional layer to the opaque lacquer layer disposed on the rear surface of the substantially transparent plastic molded part wherein the additional layer is selected from the group consisting of a transparent lacquer, an opaque lacquer, a transparent non-tacky film and an opaque non-tacky film.

* * * * *